United States Patent [19]

Busch et al.

[11] 3,897,384
[45] July 29, 1975

[54] MOULDING COMPOSITIONS CONTAINING PHOSPHOROUS, TALC, AND, OPTIONALLY, METAL CARBONATE AS FILLERS

[75] Inventors: Wolfram Busch, Massenheim-Gartenstadt; Hans Paul Gilfrich, Wiesbaden-Biebrich; Albrecht Scholz, Hochheim; Hermann Wallhauber, Wehen, all of Germany

[73] Assignee: Hoechst Aktiengesellschaft, Wiesbaden, Germany

[22] Filed: Apr. 8, 1974

[21] Appl. No.: 458,642

Related U.S. Application Data

[63] Continuation of Ser. No. 264,539, June 20, 1972, abandoned.

[30] Foreign Application Priority Data

June 26, 1971 Germany............................ 2131845
July 22, 1971 Germany............................ 2136669

[52] U.S. Cl.......................... 260/40 R; 260/DIG. 24
[51] Int. Cl............................................. C08g 51/04
[58] Field of Search............ 260/40 R, DIG. 24, 861

[56] References Cited
UNITED STATES PATENTS

| | | | |
|---|---|---|---|
| 2,840,538 | 6/1958 | Minter et al. | 260/40 R |
| 2,904,533 | 9/1959 | Carlston et al. | 260/861 X |
| 3,227,665 | 1/1966 | Fourcode et al. | 260/861 X |
| 3,242,257 | 3/1966 | Jones et al. | 260/40 R X |
| 3,252,941 | 5/1966 | Mayer et al. | 260/861 X |

*Primary Examiner*—Donald E. Czaja
*Assistant Examiner*—S. M. Person
*Attorney, Agent, or Firm*—Hammond & Littell

[57] ABSTRACT

A thermosetting moulding composition comprising A) an unsaturated polyester derived from a carboxylic acid component selected from the group consisting of 1) terephthalic acid, isophthalic acid, and mixtures thereof and 2) an acid component selected from the group consisting of fumaric acid, maleic acid, and a combination thereof and from a dihydric alcohol, B) a copolymerisable monomer, C) a peroxide catalyst, and D) an inorganic filler component which at least in part consists of finely divided red phosphorus and a component selected from the group consisting of a) talc, b) a combination of talc and an alkaline earth metal carbonate, a moulded electrical article obtained from said hardened composition.

13 Claims, No Drawings

MOULDING COMPOSITIONS CONTAINING PHOSPHOROUS, TALC, AND, OPTIONALLY, METAL CARBONATE AS FILLERS

This application is a continuation of our co-pending application Ser. No. 264,539, filed June 20, 1972, and now abandoned.

This invention relates to moulding compositions and moulded articles produced from such compositions.

Moulding composition based on unsaturated polyesters, polymerisable monomers, red phosphorus, inorganic fillers, hardening catalysts and other conventional ingredients such as mould release agents and lubricants may be used in the production of moulded articles having properties which render them particularly suitable for use as electric insulating members. Furthermore with moulding compositions based on specific resin compositions it is possible to considerably raise the tracking resistance of moulded articles produced therefrom and so allow the compositions to be used in the manufacture of articles having high tracking resistance.

A creeping current is formed if the surface of an insulating material becomes conductive, e.g. due to contamination. If the connection between the conductive surface and the interior of an article is not continuous or is interrupted by the action of creeping current an arc may be set up particularly at high voltages. In addition arcs may be set up during switching operations. As a result of an arc plastics may be thermally stressed to such an extent that, due to decomposition occuring within a comparatively short period of time, a conductive layer is formed on the exterior surface of the insulating article and this leads to short-circuiting.

Considerable research effort has been expended in order to develop moulded articles based on unsaturated polyesters having high resistance to arcing and which will therefore be suitable for use in heavy electrical engineering at high voltages. A material which is resistant or substantially resistant to thermal decomposition would represent a significant advance in the art since even if an arc occurred permanently on the plastic surface no conductive layer would be formed which could lead to a short circuit.

The effects resulting from the stressing of the surface of a plastics material with an arc are very difficult to identify. In addition to depolymerisation and cracking, carbonization and graphite formation occur and this probably increases the conductivity rapidly. The former phenomena often lead to the splitting off of readily volatile products which can be ignited and initiate combustion of the whole article. In addition there is a correlation between the tracking resitance and the arcing resistance. Thus a precondition for arching resitance is high tracking resistance and non-inflammability. Previously there has been more concern with the possibility of decomposition occurring due to secondary reactions or to graphite conductive coating than with any attempt to reduce chemical decomposition occuring during the action of an arc. It has thus been proposed to add hydrates e.g. aluminium oxide hydrate to eliminate graphite coatings formed since the water given off during heating of the hydrate reacts the carbon according to the equation $C + H_2O = CO + H_2$ and converts it into gaseous products.

As this reaction does not take place quantitatively the resulting conductive graphite layer is not quantitatively decomposed. Consequently the formation of a conductive coating is not prevented but only delayed. Furthermore the addition of an inorganic hydrate additive may be undesirable since water is given off under the action of heat and this may rupture the plastic bond and lead to partial destruction of the moulded article.

We have now found that a reduction in arcing resistance may be achieved without the disadvantages of the known fillers if ground talc of formula $Mg_3[(OH)_2Si_4O_{10}]$ is used as the sole filler or in combination with carbonate-containing fillers, calcium carbonate or other alkaline earth metal carbonates in moulding compositions.

The present invention provides a thermosetting moulding composition comprising A) an unsaturated polyester derived from a carboxylic acid component comprising terephthalic and/or isophthalic acid and fumaric acid and a dihydric alcohol, B) a copolymerisable monomer, C) a peroxide catalyst, or D) an inorganic filler component which consists of or includes finely divided red phosphorus and talc.

If desired the carboxylic acid component may include a mixture of fumaric and maleic acids.

Although talc may be used alone as ingredient E) in the compositions according to the invention, it is preferred to use a combination of talc and an alkaline earth metal carbonate.

The polyester A) and monomer B) are generally contained in the moulding composition in a quantity of at least 10, preferably at least 15 % by weight, the red phosphorus in a quantity of 0.2 to 10, preferably 0.5 to 5 % by weight, talc in a quantity of 10 to 70, preferably 20 to 60 % by weight, whereby the percentage figures are always related to the total moulding composition. If talc and an alkaline earth metal carbonate are present the weight ratio of talc to carbonate may be from 5 : 1 to 20 : 1. The total quantity of talc, red phosphorus and, if present, alkaline earth metal carbonate is preferably no more than 85 % by weight and that of talc and of red phosphorus is preferably no more than 70 % by weight.

Ingredient D) may include reinforcing materials and the moulding compositions according to the invention may also contain further conventional additives such as for example mould release agents and lubricants. The moulding compositions may be prepared in a manner known per se e.g. maleic acid may be used in place of fumaric acid under polyesterification conditions that ensure at least partial isomerization to fumaric acid.

Moulded articles produced from moulding compositions according to the invention possess, even under extreme conditions, surprisingly high arcing resistance as compared with moulded articles made from known compositions. Additionally the moulded articles have high tracking resistance and greatly improved non-inflammability characteristics. Thus such moulding compositions are particularly suited for the production of insulators of all types particularly for heavy electrical engineering purposes and for use as circuit breaker members and claddings as well as for other electrical engineering applications such as explosion chambers in power electronics e.g. thyristor parts as well as insulating members for high voltages and/ or currents.

The preferred dihydric alcohols for use in the preparation of the unsaturated polyesters are symmetric diols i.e. compounds possessing two equally reactive OH groups, e.g. preferably ethyleneglycol. Unsymmetric dihydric alcohols (i.e. having differently reactive OH groups) may also be used however. The symmetric diol proportion is preferably at least 30 mol % based on the total dihydric alcohol used. Symmetrical diols yield a polyester possessing a high degree of crystallinity whilst unsymmetric diols yield a polyester possessing a lower degree of crystallinity. Other suitable symmetric diols include diethyleneglycol, propane-1,3-diol, butane-1,4-diol, butane-2,3-diol, Δ-2,3-butene-1,4-diol, 2,2-dimethylpropane-1,3-diol, 1,4-dimethylolcyclohexane, 4,4'-dihydroxydicyclohexylpropane and homologs thereof as well as their bisethylene, bis-propylene and bisbutyleneglycol ethers, or ethers of 4,4'-dihydroxydiphenylpropane and its homologs. The preferred unsymmetric diol used is propane-1,2-diol, particularly if ethyleneglycol is used as the symmetric diol because the composition of the mixture need not otherwise be changed due to the difference of molecular weights of the propanediol and the ethyleneglycol by only one methylene group.

The use of propane-1,2-diol tends to reduce the water absorptivity and shrinkage of the moulded articles. Other suitable unsymmetric diols include butane-1,2-diol, butane-1,3-diol, pentane-1,4-diol and unsymmetrical hydroxy group-containing ethers of dihydroxy diphenylpropane and its homologs.

The use of polyesters composed of approximately equimolecular quantities of acids and dihydric alcohols is preferred. The excess of one reaction ingredient is preferably not more than 5 equivalent % and desirably not more than 2 equivalent %. By careful selection of the dihydric alcohol and by using mixtures of several alcohols, polyesters can be formed which contain any desired level of crystallinity. Thus the temperature at which the resin in the mixture with the monomers and the filler or fibrous materials crystallizes can be influenced. The mixture is so composed that the melting temperature of the mixtures are generally in the range of from room temperature to about 50°C and this is lower than the decomposition temperature of the peroxide compounds used as polymerization catalysts.

The polymerizable monomer may be vinyl and/or allyl compound having a boiling point in excess of 140°C, preferably above 170°C. Suitable monomers thus include styrene; m- or p-vinyl toluene; halogenated styrene; α-methylstyrene; the diallyl ester of maleic, fumaric, itaconic, succinic, adipic, azeleic, sebacic, phthalic or isophthalic acid; triallylcyanurate; triallylphosphate; an allylether of a polyhydric alcohol such as pentaerythritol tetraallylether or trimethylolpropane-triallylether; ethyleneglycol-dimethacrylate; and hexahydro-1,3,5-triacrylotriazine. Generally the proportion of monomers is from 3 to 50%, preferably from 10 to 40% based on the weight of the polyester monomer mixture.

Organic peroxides which may be used are for example benzoylperoxide, 2,4-dichlorobenzoylperoxide, tert-butylperoxide or hydroperoxide, laurylperoxide, cyclohexanone peroxide, cumenehydroperoxide, tert-butylperacetate, tert-butylperbenzoate, montert-butylpermaleate, tert-butylperoctoate, 2,5-dimethyl-2,5-di-(benzoylperoxy)-hexane, 2,5-dimethyl-2,5-di-(tert-butylperoxy)-hexane, and 2,5-dimethyl-2,5-di-(tert-butylperoxy)-hexine. These peroxides are generally used in a quantity of from 0.5 to 5, preferably from 1 to 4% by weight, based on the total weight of the polyester and the monomers. The decomposition temperature of the peroxide compound is chosen according to the type of catalyst and may be from 60° to 80°C, although the decomposition temperature is preferably over 80°C and may even be over 100°C. Due to the reduced melting temperature of the products the realiability of processing during the mixing of the ingredients is increased.

Any conventional lubricant can be used such as stearic acid or its alkali metal or alkaline earth metal salts, ester waxes, esters of stearic acid with high molecular weight alcohols, polyamide waxes, reaction products of high molecular weight polyamines with fatty acids, decomposed polyethylene waxes having a molecular weight of e.g. not exceeding 10,000, preferably not exceeding 5,000, and silicon compounds. These substances may also be used as an external release agent.

Red phosphorus which reduces inflammability is preferably added to the moulding compositions according to the invention in finely divided form.

Fillers which can be used in addition to talc include inorganic minerals such as oxides, sulphates and preferably carbonates, e.g. calcium carbonate, magnesium oxide, calcium sulphate, barium sulphate and certain aluminas, as well as mixtures of these substances.

Reinforcing materials for increasing the mechanical properties of the compositions may be organic fibres although inorganic fibres are preferred such as glass fibres with conventional known cut lengths and known adhesives and sizes, asbestos, wollastonite, polyamide, polyethyleneterephthalate, polyacrylonitrile, or natural fibres such as cotton. In addition to these fibres it is also possible to use mats or warp knitted fabrics manufactured from the indicated materials. Furthermore conventional additives such as pigments, dyes, inhibitors and accelerators may also be used in the compositions.

The production of the moulding compositions may be carried out in conventional manner on heated rollers and extruders in accordance with the melt impregnation process or in mixtures with subsequent strainer extrusion according to the solvent process. The strands of fibres obtained may be impregnated with a solution or paste containing all the remaining ingredients of the moulding composition whereafter, if necessary, the composition is dried and comminuted.

The processing of the moulding compositions according to the invention can take place e.g. by moulding, injection moulding, or transfer moulding processes, but also by extruding in order to produce continuous sections. It takes place under conditions favourable for unsaturated polyester moulding compositions. Thus e.g. for a perfect 30 mm thick sheet employing the transfer moulding process with pelleting and preheating in the high frequency range a maximum hardening time of 5 minutes at 140°C is necessary.

As stated above the moulded articles obtained from compositions according to the invention are suitable for use as insulators for heavy electrical engineering or electrical insulator parts and are characterised by an elevated tracking and arcing resistance of the following order:- a. tracking resistance according to DIN 53480, measured according to the KA process with test solution A: stage KA 3c and measured according to the KB process with test solution A or F: stage KB > 600, b. arcing resistance according to ASTM-D 495 > 240 seconds c. a 30 mm long alternating current arc (40kV, 100 mA) may act on the article for several hours without a conductive bridge being formed and without the moulding material being destroyed due to a large temperature increase by melting, decomposition or cracking.

Moulded articles made from conventional unsaturated polyester moulding compositions and also from melamine-formaldehyde and epoxide compositions, and also phenylformaldehyde, urea-formaldehyde and melamine-phenolformaldehyde compositions tend to form conductive bridges particularly if tests b and c are used. Commercially available thermoplastic materials behave similarly or melt under the action of the arc.

Moulded articles prepared from the compositions according to the invention displayed the values indicated under a to c after being exposed to an industrial atmosphere for 300 days.

As is well known special problems occur with insulators used in tracked transport systems. With conventional insulators made from porcelain, ceramic or glass used previously for this purpose the manufacture of tension-free insulating bodies is extremely difficult and furthermore these materals are very susceptible to rupture. These are important factors of the articles to be used as insulators for the overhead lines of tracked vehicles. Due to the large quantities required an economic manufacture is particularly important. Since the insulators are subject to a high degree of mechanical stress in use, a reduced susceptibility to rupture is important otherwise the insulators would become damaged during transportation and erection. Furthermore at high speeds of the tracked vehicles the insulators would crack if they were too brittle due to the mechanical vibrations of the overhead wires.

These disadvantages are not exhibited with insulators made from the materials according to the invention and they are therefore suitable for vehicles, lifting and conveying means which for their movement and/or operation tap electrical energy from a system via sliding contacts. The moulded articles made from compositions according to the invention possess improved properties when compared to insulator members which were hitherto made of very brittle material such as porcelain, ceramic or glass. Additionally these moulded articles can be manufactured rapidly and if desired completely automatically by moulding, injection moulding and transfer moulding processes.

Although the insulators or insulating members according to the invention are particularly suitable for tracked transport systems and more particularly for insulators on contact wires, they are also suitable for other vehicles, lifting and conveying means such as trolley buses, cranes and lifts. A particularly important use is in insulator shields e.g. those mounted on rod- or tube-like cores made from per se known glass fibre reinforced duroplasts e.g. unsaturated polyesters. Such a core must have a certain tensile strength and the insulator shield or shields determines the essential electrical properties. The shields can be mounted on the rod individually or in the form of previously made combinations of several shields.

One such type of shield comprises a suspended insulator having a glass fibre reinforced core whereon are located the insulator shields made from the moulding compositions according to the invention whereby the suspension is so designed that the glass fibre reinforced core is conically extended at the ends and this extension is in each case grasped by a cap having a corresponding conical recess to that the cap carries the suspension ring.

Moulded articles made from the moulding compositions according to the invention can be varnished, e.g. for the purpose of raising the resistance to atmospheric influences. Varnishing need not improve the electrical properties but it should not impair them, i.e. it must either be resistant to creeping currents or arcs or at the stressed points it should burn away to such an extent that no conductive trace remain. In particular varnishing must provide protection against moisture absorption. Suitable for the varnishing is e.g. a varnish based on hydroxy group-containing acrylic resins. Due to the hydroxy group content such resins can be cross-linked with polyisocyanates or etherified or partially etherified melamine resins and to a degree previously indicated by the hydroxy groups. Such acrylic resins can e.g. be produced from acrylic or methacrylic acid alkyl esters, acrylic and/or methacrylic acid and also sytrene and other modifying ingredients. It is also possible to use combinations of etherified or partially etherified melamine resins with alkyd resins. The varnishes can be pigmented with known organic or inorganic pigments provided that these do not themselves conduct or provide any conductive residues during atmospheric or electrical action. A suitable pigment is e.g. titanium dioxide.

The following examples are given by way of illustration only. In the examples the advantages of the invention relative to the prior art are indicated relative to certain moulding compositions. The term "part" relates to parts by weight.

EXAMPLE 1

22 parts of an unsaturated polyester with an acid number of 37 produced from 30 mole % of fumaric acid, 20 mol % of terephthalic acid and 50 mol % of butane-1,4-diol in the melt are dry mixed with 2 parts of diallylphthalate, 1 part of tert-butylperoctoate, 1.5 parts of zinc stearate, 1 part of ground red phosphorus, 62.5 parts of ground talc and 10 parts of cut glass fibres of cut length 6 mm, finished with a vinyl silane size, and subsequently plasticized on heated rollers and processed to thin sheets. After solidification the sheet can be ground to a fine grained moulding powder which in the moulding process can be processed to test rods and plates within 3 minutes at 160°C and at a pressure of 150 kg/cm$^2$. Moulded articles produced in this way have the properties indicated in the table below.

In addition to the standard measurement the arcing resistance 40 kg/100 mA was determined according to the following method. On a plate made from the moulding composition were placed two electrodes 30 mm apart. At a voltage of 40 kV an arc is drawn between the electrodes at an intensity of 100 mA and comes into contact with the plastic surface which it places under extreme thermal load. The arcing resistance is considered to be the time in seconds up to short circuiting.

COMPARISON EXAMPLE 1

Instead of the talc used in Example 1 an inorganic filler which was 42.5 parts of ground kaolinite were used. A plate made and processed in accordance with Example 1 has the properties shown in the table below.

EXAMPLE 2

27 parts of an unsaturated polyester with an acid number of 32 produced from 35 mol % of fumaric acid, 15 mol % of isophthalic acid and 50 mol % of ethyleneglycol in the melt are dry mixed with 3 parts of diallyphthalate, 1 part of tert-butylperbenzoate, 2 parts of zinc stearate, 2 parts of ground red phosphorus, 45 parts of ground talc, 5 parts of ground limestone and 15 parts of cut glass fibres of cut length 3 mm, finished with a vinyl silane size and subsequently plasticized in a heated Buss extruder and discharged in thin lumps. After solidification the extrudate can be ground and converted into a fine grained moulding powder. Within 3 minutes at 160°C and 150 kp/cm² pressure test bodies can be produced having excellent properties as shown in the table below.

COMPARISON EXAMPLE 2

Instead of the talc used in Example 1 an inorganic filler which was 50 parts of ground limestone is used. A plate produced and processed in the same way as Example 2 has the characteristics shown in the table below.

EXAMPLE 3

The advantages resulting from the varnishing process are shown in the following test:

Test bodies were coated with a lacquer based on an acrylate resin with a hydroxy number of 80, composed of styrene, acrylic acid and glycidyl ester of a long chained fatty acid with the following variations:
1. Unpigmented, air dried
2. pigmented with titanium dioxide with the ratio of binder to pigment 1 to 0.7, air dried
3. unpigmented but stoved for 30 minutes at 80°C
4. pigmented but stoved for 30 minutes at 130°C
5. pigmented but stoved for 30 minutes at 80°C
6. pigmented but stoved for 30 minutes at 130°C
7. unvarnished These test bodies were subsequently treated as follows:

a. storage for 1600 hours in the weatherometer
b. 2200 hours salt spray test according to ASTM B 117-61
c. 3900 hours alternating in climate, storage involving 8 hours at 40°C and 100° relative atmospheric humidity and 16 hours under normal ambient climatic conditions Subsequently the following tests were performed:
I. surface resistance according to DIN 53,482
II. arcing resistance according to ASTM D 495
III. tracking resistance according to DIN 53,480 KB process It was thereby found that particularly with the test bodies coated with pigmented varnish no deterioration took place and in part there was actually an improvement of the properties indicated under I to III compared with the unvarnished test bodies. Lattice cut tests performed after treatments $a$ to $c$ did not lead to the varnish being detached from the substrate.

It is not intended that the examples given herein should be construed to limit the invention thereto, but rather they are submitted to illustrate some of the specific embodiments of the invention. Resort may be had to various modifications and variations of the present invention without departing from the spirit of the discovery or the scope of the appended claims.

What we claim is:

1. A thermosetting moulding composition comprising A) an unsaturated polyester derived from a carboxylic acid component selected from the group consisting of 1) terephthalic acid, isophthalic acid, and mixtures thereof and 2) an acid component selected from the group consisting of fumaric acid, maleic acid, and a combination thereof and from a dihydric alcohol, B) a copolymerizable monomer which is present in an amount of from 3 to 50% by weight of the polyester-monomer mixture, C) a peroxide catalyst, and D) an inorganic filler component which at least in part consists of finely divided red phosphorus in an amount of from 0.2 to 10% by weight, based on the total moulding composition and a component selected from the group consisting of a) talc, and b) a combination of talc and an alkaline earth metal carbonate in a weight ratio of from 5:1 to 20:1, said talc being present in an amount of from 10 to 70% by weight based on the total moulding composition, and A) and B) being present in an amount of at least 10% by weight based on the total moulding composition.

TABLE

| | Example 1 | Comparison Example 1 | Example 2 | Comparison Example 2 |
|---|---|---|---|---|
| Arcing resistance according to ASTM D 495 (sec.) | >240 | 182 | >240 | 181 |
| Arcing resistance 40 kV/100 mA (sec.) | exceeding 300 | 5 | exceeding 300 | 3 |
| Tracking resistance according to DIN 53480, Stage KB (KB processed with test solution A) | >600 | 480 | >600 | 420 |
| Heat resistance according to DIN 53459, quality grade : | 4 | 4 | 4 | 4 |
| Weight loss (mg) | 100 | 100 | 120 | 130 |
| Flame path (cm) | 0.5 | 0.5 | 0.4 | 0.5 |

2. A moulding composition according to claim 1 wherein the overall amount of inorganic filler component does not exceed 85% by weight, calculated on the total moulding composition.

3. A moulding composition according to claim 1 wherein the melting temperature of the mixture of the resin and the monomer is in the range of from ambient temperature to 50°C.

4. A moulding composition according to claim 1 wherein the polyester contains at least 30 mol % a symmetric dihdyric alcohol calculated on the total amount of dihydric alcohol.

5. A moulding composition according to claim 1 wherein the copolymerizable monomer has a boiling point exceeding 140°C.

6. A moulding composition according to claim 1 wherein the acid and the alcohol component of the polyester are present in quantities such that none of these components is present in an amount exceeding the equivalent amount of the other one by more than 5 equivalent-%.

7. A moulding composition according to claim 1 wherein at least one substance from the group consisting of stearic acid, its alkali metal salt, its alkaline earth metal salt, an ester of stearic acid with a high molecular weight alcohol, a polyamide wax, a reaction product of a polyamine and a fatty acid, depolymerised polyethylene with a molar weight not exceeding 10,000, a silicone, and a combination thereof is also present as external lubricant.

8. A moulded article which is an electrical product having an improved arc resistance obtained by hardening a thermosetting moulding composition, comprising A) an unsaturated polyester derived from a carboxylic acid component selected from the group consisting of 1) terephthalic acid, isophthalic acid, and mixtures thereof and 2) an acid component selected from the group consisting of fumaric acid, maleic acid, and a combination thereof and from a dihydric alcohol, B) a copolymerizable monomer which is present in an amount of from 3 to 50% by weight of the polyester-monomer mixture, C) a peroxide catalyst, and D) an inorganic filler component which at least in part consists of finely divided red phosphorus in an amount of from 0.2 to 10% by weight based on the total moulding composition and a component selected from the group consisting of a) talc and b) a combination of talc and an alkaline earth metal carbonate in a weight ratio from 5:1 to 20:1, said talc being present in an amount of from 10 to 70% by weight based on the total moulding composition and A) and B) being present in an amount of at least 10% by weight of the total moulding composition.

9. A moulded article according to claim 8 which is an insulator or a part thereof determining the electrical characteristics.

10. A moulded article according to claim 8 wherein the insulator is a part of an apparatus selected from the group consisting of vehicles, lifting means and conveying means which for movement, operation, or both can tap electrical energy from a system via sliding contacts.

11. A moulded article according to claim 8 which is an insulator for tracked vehicles or a part thereof determining the electrical characteristics.

12. A moulded article according to claim 8 which is covered with a lacquer.

13. A moulded article according to claim 8 wherein the lacquer which is applied to the insulator or a part thereof is resistant to creeping currents and arcs which occur or, at the stressed points, burns away so that no conductive trace is left behind.

* * * * *